(12) United States Patent
Inoue

(10) Patent No.: US 6,981,928 B2
(45) Date of Patent: Jan. 3, 2006

(54) CONTINUOUSLY VARIABLE TRANSMISSION APPARATUS

(75) Inventor: Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/410,210

(22) Filed: Apr. 10, 2003

(65) Prior Publication Data

US 2003/0220167 A1 Nov. 27, 2003

(30) Foreign Application Priority Data

Apr. 12, 2002 (JP) ................................ P. 2002-110919

(51) Int. Cl.
*F16H 37/02* (2006.01)

(52) U.S. Cl. ................ 475/216; 475/214; 475/215; 475/217; 475/218

(58) Field of Classification Search ................ 475/214, 475/215, 216, 217, 218
See application file for complete search history.

(56) References Cited

U.S. PATENT DOCUMENTS

| | | | | |
|---|---|---|---|---|
| 5,453,061 A | * | 9/1995 | Fellows | 475/215 |
| 5,607,372 A | * | 3/1997 | Lohr | 475/216 |
| 5,888,160 A | | 3/1999 | Miyata et al. | |
| 6,059,685 A | * | 5/2000 | Hoge et al. | 475/214 |
| 6,099,431 A | | 8/2000 | Hoge et al. | |
| 6,171,210 B1 | | 1/2001 | Miyata et al. | |
| 6,213,907 B1 | | 4/2001 | Wooden | |
| 6,251,039 B1 | * | 6/2001 | Koga | 475/216 |
| 6,358,178 B1 | * | 3/2002 | Wittkopp | 475/207 |
| 6,422,966 B1 | * | 7/2002 | Haka | 475/216 |
| 6,585,619 B2 | * | 7/2003 | Henzler | 475/214 |
| 6,719,659 B2 | * | 4/2004 | Geiberger et al. | 475/216 |
| 2002/0019285 A1 | | 2/2002 | Henzler | |

FOREIGN PATENT DOCUMENTS

| | | | |
|---|---|---|---|
| JP | 56028343 A | * | 3/1981 |
| JP | 1-169169 | | 7/1989 |
| JP | 1-312266 | | 12/1989 |
| JP | 6-174033 | | 6/1994 |

* cited by examiner

*Primary Examiner*—Charles A. Marmor
*Assistant Examiner*—David D. Le
(74) *Attorney, Agent, or Firm*—Sughrue Mion, PLLC

(57) ABSTRACT

A continuously variable transmission apparatus is constructed by a combination of a toroidal-type continuously variable transmission unit (11a) and a planetary-gear-type transmission unit (12c). The planetary-gear-type transmission unit (12c) includes a carrier (24d), a plurality of first planetary gears (44), a hollow rotary shaft (33), a first sun gear (45), a plurality of second planetary gears (46), a second sun gear (47) and a ring gear (48). The first and second planetary gears (44, 46) are meshed with the single ring gear (48) while said first and second planetary gears (44, 46) are supported on said carrier (24d) independently of each other.

9 Claims, 11 Drawing Sheets

CONTINUOUSLY VARIABLE TRANSMISSION APPARATUS

BACKGROUND OF THE INVENTION

1. Field of the Invention

The present invention relates to a continuously variable transmission which can be used as an automatic transmission apparatus for a vehicle or as a transmission apparatus for adjusting the operating speed of various industrial machines such as a pump.

2. Description of the Related Art

As an automatic transmission apparatus for a vehicle, use of such a toroidal-type continuously variable transmission unit as shown in FIG. 6 has been studied, and has been executed in part of the vehicle industry. This toroidal-type continuously variable transmission unit is referred to as a double cavity type, in which input side disks 2, 2 serving as outside disks are respectively supported through their associated ball splines 3, 3 in the peripheries of the two end portions of an input shaft 1 corresponding to a first rotary shaft. Therefore, these two input side disks 2, 2 are supported in such a manner that they are disposed concentric with each other and can be rotated in synchronization with each other. Also, in the periphery of the middle portion of the input shaft 1, there is supported an output gear 4 in such a manner that it can be rotated with respect to the input shaft 1. And, with the two end portions of a cylindrical portion disposed in the central portion of the output gear 4, there are spline-engaged output side disks 5, 5 which correspond to inside disks. Therefore, these two output side disks 5, 5 can be rotated in synchronization with each other together with the output gear 4.

Also, respectively between the input side disks 2, 2 and output side disks 5, 5, there are interposed a plurality of (normally, two or three) power rollers 6, 6 in such a manner that they are held by the input and output side disks 2 and 5. These power rollers 6, 6 are respectively rotatably supported on the inner surfaces of their associated trunnions 7, 7 through their associated support shafts 8, 8 and a plurality of rolling bearings. The trunnions 7, 7 can be swung about and shifted with respect to pivot shafts (not shown) which are so disposed in the length-direction (in FIG. 6, the front and back direction) two end portions of the respective trunnions 7 as to be concentric with each other. To incline the trunnions 7, 7, the trunnions 7, 7 may be shifted in the axial direction of their associated pivot shafts using an oil-pressure type of actuator (not shown); and, the inclination angles of all of the trunnions 7, 7 may be synchronized with each other hydraulically as well as mechanically.

To operate the above-structured toroidal-type continuously variable transmission unit, one (in FIG. 6, the left) input side disk 2 is driven and rotated by a drive shaft 9, which is connected to a power source such as an engine, through a pressing device 10 of a loading cam type. As a result of this, the pair of input side disks 2, 2 respectively supported on the two end portions of the input shaft 1 are synchronously rotated while they are being pressed in their mutually approaching directions. And, the rotational movements of the input inside disks 2, 2 are respectively transmitted through their associated power rollers 6, 6 to their associated output side disks 5, 5, and are then taken out from the output gear 4.

In case of changing the ratio of the rotation speed between the input shaft 1 and output gear 4, firstly, to reduce the rotation speed ratio between the input shaft 1 and output gear 4, the trunnions 7, 7 are swung and shifted to such positions as shown in FIG. 6; and, the peripheral surfaces of the power rollers 6, 6, as shown in FIG. 6, are respectively contacted with the near-to-center portions of the inner surfaces of the input side disks 2, 2 and the near-to-outer-periphery portions of the inner surfaces of the output side disks 5, 5. On the other hand, to increase the rotation speed ratio between the input shaft 1 and output gear 4, the trunnions 7, 7 are swung and shifted in the opposite direction to FIG. 6 are thereby inclined in such a manner that the peripheral surfaces of the power rollers 6, 6, oppositely to the state shown in FIG. 6, can be respectively contacted with the near-to-outer-periphery portions of the inner surfaces of the input side disks 2, 2 and the near-to-center portions of the inner surfaces of the output side disks 5, 5. In case where the inclination angles of the trunnions 7, 7 are set intermediate between the above states, there can be obtained an intermediate speed ratio (transmission ratio) between the input shaft 1 and output gear 4.

In the case of the toroidal-type continuously variable transmission unit shown in FIG. 6, the power transmission from the input shaft 1 to the output gear 4 is achieved through two systems: that is, one system between one input side disk 2 and one output side disk 5, the other between the other input side disk 2 and the other output side disk 5. Therefore, with use of this toroidal-type continuously variable transmission unit, large power can be transmitted.

Further, in order to incorporate the above-structured and operated toroidal-type continuously variable transmission unit into an actual continuously variable transmission for a vehicle, there has been conventionally proposed a technique in which a continuously variable transmission apparatus is constructed by combining the present toroidal-type continuously variable transmission unit with a planetary gear mechanism; for example, this construction technique is disclosed in JP-A-1-169169, JP-A-1-312266, U.S. Pat. No. 5,888,160, U.S. Pat. No. 6,171,210 and so on.

Now, FIG. 7 shows a continuously variable transmission apparatus disclosed in the U.S. Pat. No. 6,171,210 that is included in the above-cited patent publications. This continuously variable transmission apparatus is composed of a combination of a double-cavity-type toroidal-type continuously variable transmission unit 11 and a planetary-gear-type transmission unit 12. In the low speed running operation thereof, power is transmitted only by the toroidal-type continuously variable transmission 11. And, in the high speed running operation thereof, power is transmitted mainly by the planetary-gear-type transmission unit 12, while the speed ratio of the planetary-gear-type transmission unit 12 can be controlled by changing the speed ratio of the toroidal-type continuously variable transmission unit 11.

For this purpose, the leading end portion (in FIG. 7, the right end portion) of the input shaft 1 being a first rotary shaft, which not only penetrates through the central portion of the toroidal-type continuously variable transmission unit 11 and supports a pair of input side disks 2, 2 on the two end portions thereof but also corresponds to a first rotary shaft, is connected through a high-speed clutch 16 to a transmission shaft 15 fixed to the central portion of a support plate 14 supporting thereon a ring gear 13 which constitutes part of the planetary-gear-type transmission unit 12. The structure of the toroidal-type continuously variable transmission unit 11 is substantially the same as the conventional structure previously shown in FIG. 6 except for the pressing device 10a.

Also, between the output side end portion (in FIG. 7, the right end portion) of a crankshaft 18 of an engine 17 serving as a drive source and the input side end portion (the base end portion; that is, in FIG. 7, the left end portion) of the input shaft 1, there are interposed a start clutch 19 and an oil-pressure-type pressing device 10a in such a manner that they are arranged in series with each other with respect to the power transmission direction. To the pressing device 10a, in accordance with a signal issued from a controller (not shown), there can be introduced a desired oil pressure which is able to generate a pressing force corresponding to the size (torque) of the power that is transmitted from the crankshaft 18 to the toroidal-type continuously variable transmission unit 11.

Also, an output shaft 20, which is used to take out power based on the rotation of the input shaft 1 and corresponds to a second rotary shaft, is disposed concentrically with the input shaft 1. And, in the periphery of the output shaft 20, there is disposed the planetary-gear-type transmission unit 12. A sun gear 21 constituting the planetary-gear-type transmission unit 12 is fixed to the input side end portion (in FIG. 7, the left end portion) of the output shaft 20. Therefore, the output shaft 20 can be rotated as the sun gear 21 is rotated. In the periphery of the sun gear 21, there is supported the ring gear 13 in such a manner that it is concentric with the sun gear 21 and can be rotated. And, between the inner peripheral surface of the ring gear 13 and the outer peripheral surface of the sun gear 21, there are interposed a plurality of planetary gears 22, 22. Each of the planetary gears 22, 22 is constructed by a pair of planetary gear elements 23a, 23b. These planetary gear elements 23a, 23b are meshingly engaged with each other; and, the planetary gear element 23a disposed on the outside diameter side is meshingly engaged with the ring gear 13, while the planetary gear element 23b disposed on the inside diameter side is meshingly engaged with the sun gear 21. The planetary gears 22, 22 are rotatably supported on one side surface (in FIG. 7, the left side surface) of a carrier 24. Also, the carrier 24 is rotatably supported on the middle portion of the output shaft 20.

Also, the carrier 24 is connected to the pair of output side disks 5, 5 constituting the toroidal-type continuously variable transmission unit 11 through a power transmission mechanism 25 in such a manner that rotation power can be transmitted between them. This power transmission mechanism 25 includes a transmission shaft 26 arranged in parallel to the input shaft 1 and output shaft 20, a sprocket 27a fixed to one end portion (in FIG. 7, the left end portion) of the transmission shaft 26, a sprocket 27b fixed to the output side disks 5, 5, a chain 28 provided between and over these two sprockets 27a and 27b, and first and second gears 29, 30 which are respectively fixed to the other end (in FIG. 7, the right end) of the transmission shaft 26 and carrier 24 and are meshingly engaged with each other. Therefore, as the output side disks 5, 5 are rotated, the carrier 24 is rotated in the opposite direction to the output side disks 5, 5 at a speed corresponding to the number of the teeth of the first and second gears 29, 30 and the pair of sprockets 27a and 27b.

On the other hand, the input shaft 1 and ring gear 13 can be connected to each other through the transmission shaft 15 disposed concentrically with the input shaft 1 in such a manner that the rotation power can be transmitted between them. Between the transmission shaft 15 and input shaft 1, the high-speed clutch 16 is disposed in series to the two shafts 15 and 1. Therefore, while the high-speed clutch 16 is in connection, in accordance with the rotation of the input shaft 1, the transmission shaft 15 is rotated in the same direction and at the same speed as the input shaft 1.

Also, the continuously variable transmission apparatus shown in FIG. 7 includes a clutch mechanism which constitutes a mode switching means. This clutch mechanism comprises the above-mentioned high-speed clutch 16, a low-speed clutch 31 interposed between the outer peripheral edge portion of the carrier 24 and the axial-direction one end portion (in FIG. 7, the right end portion) of the ring gear 13, and a backing clutch 32 interposed between the ring gear 13 and the fixed portion of the continuously variable transmission apparatus such as a housing (not shown) thereof. These clutches 16, 31 and 32 are arranged such that, in case where any one of them is connected, the connection of the remaining two clutches are cut off.

According to the above-structured continuously variable transmission apparatus, firstly, in the low-speed operating time, the low-speed clutch 31 is connected, whereas the high-speed clutch 16 and backing clutch 32 are disconnected. In this state, in case where the start clutch 19 is connected to thereby rotate the input shaft 1, only the toroidal-type continuously variable transmission unit 11 transmits the power from the input shaft 1 to the output shaft 20. In such low-speed operating time, the speed ratios between the pair of input side disks 2, 2 and the pair of output side disks 5, 5 are controlled similarly to the case shown in FIG. 6 in which only the toroidal-type continuously variable transmission unit is used.

On the other hand, in the high-speed operating time, the high-speed clutch 16 is connected, whereas the low-speed clutch 31 and backing clutch 32 are disconnected. In this state, in case where the start clutch 19 is connected to thereby rotate the input shaft 1, the transmission shaft 15 and planetary-gear-type transmission unit 12 transmit the power from the input shaft 1 to the output shaft 20. That is, in case where the input shaft 1 is rotated in the high-speed operating time, the rotation power of the input shaft 1 is transmitted through the high-speed clutch 16 and transmission shaft 15 to the ring gear 13. And, the rotation power of the ring gear 13 is transmitted through the plurality of planetary gears 22, 22 to the sun gear 21, which rotates the output shaft 20 fixed to the sun gear 21. In this state, in case where the speed ratio of the toroidal-type continuously variable transmission unit 11 is changed to thereby vary the revolving speeds of the planetary gears 22, 22, the speed ratio of the whole of the continuously variable transmission apparatus can be controlled.

That is, in the high-speed operating time, the planetary gears 22, 22 are respectively revolved in the same direction as the ring gear 13. And, the slower the revolving speeds (around the sun gear 21) of the planetary gears 22, 22 are, the faster the rotation speed of the output shaft 20 with the sun gear 21 fixed thereto is. For example, in case where the above revolving speeds of the planetary gears and the rotation speed of the ring gear 13 (both of them are angular speeds) are equal to each other, the ring gear 13 and output shaft 20 is equal in the rotation speed thereof to each other. Also, in case where the above revolving speeds of the planetary gears are slower than the rotation speed of the ring gear 13, the rotation speed of the output shaft 20 is faster than that of the ring gear 13. On the other hand, in case where the above revolving speeds of the planetary gears are faster than the rotation speed of the ring gear 13, the rotation speed of the output shaft 20 is slower than that of the ring gear 13.

Therefore, in the high-speed operating time, as the speed ratio of the toroidal-type continuously variable transmission unit 11 is changed toward the speed reducing side, the speed ratio of the whole of the continuously variable transmission apparatus is changed toward the speed increasing side accordingly. In the state of such high-speed operating time, to the toroidal-type continuously variable transmission unit 11, there is applied a torque (assuming that a torque to be applied in the low-speed operating time is referred to as a negative torque, a positive torque is applied) not from the input side disks 2, 2 but from the output side disks 5, 5. That is, in a state where the high-speed clutch 16 is connected, a torque, which has been transmitted from the engine 17 to the input shaft 1, is transmitted through the transmission shaft 15 to the ring gear 13 of the planetary-gear-type transmission unit 12. Therefore, there exists hardly the torque that is transmitted from the input shaft 1 side to the respective input side disks 2, 2.

On the other hand, part of the torque transmitted through the transmission shaft 15 to the ring gear 13 of the planetary-gear-type transmission unit 12 is transmitted from the planetary gears 22, 22 through the carrier 24 and power transmission mechanism 25 to the respective output side disks 5, 5. In this manner, the torque to be applied from the output side disks 5, 5 to the toroidal-type continuously variable transmission unit 11 decreases as the speed ratio of the toroidal-type continuously variable transmission unit 11 is changed toward the speed reducing side in order to change the speed ratio of the whole of the continuously variable transmission apparatus toward the speed increasing side. As a result of this, in the high-speed operating time, by reducing the torque which is input to the toroidal-type continuously variable transmission unit 11, the composing parts of the toroidal-type continuously variable transmission unit 11 can be enhanced in durability.

Further, when rotating the output shaft 20 reversely in order to back the vehicle, not only the low-speed and high-speed clutches 31, 16 are both disconnected but also the backing clutch 32 is connected. As a result of this, the ring gear 13 is fixed, and the planetary gears 22, 22, while meshing with the ring gear 13 and sun gear 21, rotate around the periphery of the sun gear 21. And, the sun gear 21 and the output shaft 20 to which the sun gear 21 is fixed are rotated in the opposite direction to the direction in the above-mentioned low speed and high speed running times.

In the case of the above-structured continuously variable transmission apparatus, the securement of the transmission efficiency and the securement of the durability can be made compatible on a high level; but, on the other hand, the whole of the continuously variable transmission apparatus becomes large in size, which makes it difficult to incorporate it into a similar space to the conventional automatic transmission. That is, in the case of the continuously variable transmission apparatus shown in FIG. 7, the transmission shaft 26 is disposed in parallel to the input shaft 1. Specifically, it is necessary to prevent the transmission shaft 26 from interfering with the input side and output side disks 2, 5 as well as the trunnions 7, 7 (see FIG. 6) that are to be disposed in the vicinity of these disks 2, 5; and, therefore, the transmission shaft 26 must be disposed at a position distant from the input shaft 1. Also, it is necessary to dispose a member for transmission of the rotation power such as the sprocket 27a or the first gear 29 in the end portion of the transmission shaft 26. This raises a possibility that a housing with a continuously variable transmission stored therein can become large in size (the section area of the housing increases), which makes it difficult to install the housing within a limited space existing under the floor of the vehicle.

In view of the above circumstances, in JP-A-6-174033, there is disclosed such a continuously variable transmission apparatus as shown in FIG. 8. In the case of the present continuously variable transmission apparatus, an integrally-formed outside disk 5a constituting a toroidal-type continuously variable transmission unit 11a and a sun gear 21a constituting a planetary-gear-type transmission unit 12a are connected to each other by a hollow rotary shaft 33 which is disposed in the periphery of the input shaft 1. Also, a ring gear 13a and an output shaft 20 are connected to each other. Further, a carrier 24a is connected and fixed to the input shaft 1. And, planetary gear elements 23a, 23b constituting a planetary gear 22 supported on the carrier 24a are meshingly engaged with each other and are also meshingly engaged with the sun gear 21a or ring gear 13a, respectively.

In the case of the thus structured continuously variable transmission apparatus shown in FIG. 8, not only, while the input shaft 1 is being rotated in the same direction, the stopping state of the output shaft 20 can be realized, but also the rotation direction of the output shaft 20 can be changed. Now, FIG. 9 shows the relationship between the speed ratio (CVU speed ratio) of the toroidal-type continuously variable transmission unit 11a and the speed ratio (T/M speed ratio) of the whole of the continuously variable transmission apparatus in case where the ratio i ($z_{13}/z_{21}$) of the teeth number $z_{13}$ of the ring gear 13a to the teeth number $z_{21}$ of the sun gear 21a is set for 2. By the way, that the speed ratio is [−] means a state in which the output parts (output side disk 5a and output shaft 20) rotate in the opposite direction to the input parts (input side disks 2, 2). Also, in case where the speed ratio of the whole of the continuously variable transmission apparatus is 0, while the input parts remain rotating, the output shaft 20 is stopped.

As can be seen clearly from FIG. 9, according to the structure shown in FIG. 8, by controlling the ratio i ($z_{13}/z_{21}$) of the teeth number $z_{13}$ of the ring gear 13a to the teeth number $z_{21}$ of the sun gear 21a properly, there can be realized a continuously variable transmission apparatus in which the speed ratio is infinite and the rotation direction of the output shaft 20 can be changed with a stop state between the two rotation direction.

However, since a range where a torque passes through the toroidal-type continuously variable transmission unit 11a is wide, the securement of the durability of the toroidal-type continuously variable transmission unit 11a and the reduction of the size and weight thereof are difficult to be compatible with each other. That is, in the stop state or in a state near to the stop state (in a state where the absolute value of the speed ratio of the whole of the continuously variable transmission apparatus is small), the torque passing through the toroidal-type continuously variable transmission unit 11a is large. As can be seen from FIG. 9, in the structure shown in FIG. 8, since the values of the speed ratios of the whole of the continuously variable transmission apparatus are small in the entire range, it is difficult to secure the durability of the toroidal-type continuously variable transmission unit 11a.

On the other hand, in the structure shown in FIG. 8, in case where there is used a so called single-pinion-type planetary-gear-type transmission unit in which the same planetary gear is meshingly engaged with the ring gear 13a and sun gear 21a, the relationship between the speed ratio of the toroidal-type continuously variable transmission unit 11a and the speed ratio of the whole of the continuously variable transmission apparatus is as shown in FIG. 10. FIG. 10 also shows a case where the ratio i ($z_{13}/z_{21}$) of the teeth number $z_{13}$ of the ring gear 13a to the teeth number $z_{21}$ of the sun gear 21a is set for 2. As can be seen clearly from FIG. 10, in case where the single-pinion-type planetary-gear-type transmission unit is used, the absolute value of the speed ratio of the whole of the continuously variable transmission apparatus is large, so that the torque passing through the toroidal-type continuously variable transmission unit 11a can be controlled down to a small level. Accordingly, it is easy to secure the durability of the toroidal-type continuously variable transmission unit 11a; however, the width of the speed ratio is narrow and thus a stop state cannot be realized solely by the toroidal-type continuously variable transmission unit 11a, nor the rotation direction thereof can be changed.

Also, in U.S. Pat. No. 5,607,372, there is disclosed such a continuously variable transmission apparatus as shown in FIG. 11. In the case of the present continuously variable transmission apparatus as well, an output side disk 5a and a sun gear 21a 1 are connected together through a hollow rotary shaft 33 which is disposed in the periphery of an input shaft 1. Also, a carrier 24b is connected and fixed to the input shaft 1. And, two planetary gears 22a, 22b are coaxially supported on the carrier 24b, while one (in FIG. 11, the left gear) of them, namely, the planetary gear 22a is meshingly engaged with the sun gear 21a. On the other hand, the other (in FIG. 11, the right gear) of them, namely, the planetary gear 22b is meshingly engaged with a gear 35 which is fixed to the base end portion (in FIG. 11, the left end portion) of the transmission shaft 34. By the way, in FIG. 11, backwardly of the transmission shaft 34 with respect to the transmission direction of power, there are disposed a planetary mechanism and a clutch mechanism which are used to change the speed ratio and rotation direction. However, since they are not directly related to the invention, the description thereof is omitted here.

In the case of the continuously variable transmission apparatus shown in FIG. 11, the relationship between the speed ratio of the toroidal-type continuously variable transmission unit 11a and the speed ratio of the whole of the continuously variable transmission apparatus is as shown in FIG. 12. This FIG. 12 shows a case where the speed ration between the sun gear 21a and gear 35 (the speed ratio of the two gears 21a, 35 that is determined by the teeth number of a gear transmission mechanism interposed between the two gears 21a and 35) is 1.1 (10% speed increase). As can be seen clearly from FIG. 12, in the case of the structure shown in FIG. 11, although the width of the speed ratio of the whole of the continuously variable transmission apparatus is narrow, a range in which the absolute values of the speed ratios are large can be widened. This can reduce the amount of the torque passing through the toroidal-type continuously variable transmission unit 11a portion to thereby be able to enhance the durability of the toroidal-type continuously variable transmission unit 11a. However, a stop state and the change of the rotation direction cannot be realized solely by the toroidal-type continuously variable transmission unit 11a.

Further, in U.S. Pat. No. 6,251,039, there is disclosed such a continuously variable transmission apparatus as shown in FIG. 13. This continuously variable transmission apparatus is composed of a combination of the structure shown in FIG. 8 and the structure shown in FIG. 11; and, specifically, it is composed of a combination of a toroidal-type continuously variable transmission unit 11a and a planetary-gear-type transmission unit 12b. The structure of the toroidal-type continuously variable transmission unit 11a is similar to the structures shown in FIGS. 8 and 11; and, specifically, the toroidal-type continuously variable transmission unit 11a includes an input shaft 1, a pair of input side disks 2, 2, an output side disk 5a, and a plurality of power rollers 6, 6.

Also, the planetary-gear-type transmission unit 12b includes a carrier 24c which is connected and fixed to the input shaft 1 and one (in FIG. 13, the right) input side disk 2. On the diameter-direction intermediate portion of the carrier 24c, there is rotatably supported a first transmission shaft 36 to the two end portions of which there are fixed planetary gear elements 37a, 37b, respectively. Also, on the opposite side of the input shaft 1 with the carrier 24c interposed between them, there is rotatably supported a second transmission shaft 38 in such a manner that it is concentric with the input shaft 1, while sun gears 39a, 39b are respectively fixed to the two end portions of the second transmission shaft 38. And, the planetary gear elements 37a, 37b fixed to the two end portions of the first transmission shaft 36 are in meshing engagement with a sun gear 21a fixed to the end portion of a hollow rotary shaft 33 connected to the output side disk 5a or the sun gear 39a fixed to one end portion (in FIG. 13, the left end portion) of the second transmission shaft 38, respectively. Also, one (in FIG. 13, the left) planetary gear element 37a is meshed through another planetary gear element 40 with a ring gear 13b which is rotatably disposed on the periphery of the carrier 24c.

On the other hand, on a second carrier 41 which is disposed on the periphery of the sun gear 39b fixed to the other end portion (in FIG. 13, the right end portion) of the second transmission shaft 38, there are rotatably supported planetary gear elements 42a, 42b. By the way, the second carrier 41 is fixed to the base end portion (in FIG. 13, the left end portion) of an output shaft 20 which is disposed so as to be concentric with the input shaft 1. Also, the planetary gear elements 42a, 42b are meshed with each other; and, one planetary gear element 42a is meshed with the sun gear 39b, while the other planetary gear element 42b is meshed with a second ring gear 43 which is rotatably disposed on the periphery of the second carrier 41. Further, the ring gear 13b and second carrier 41 can be engaged with and removed from each other by a low-speed clutch 31a, the second ring gear 43 and the fixed portion such as the housing can be engaged and removed from each other by a high-speed clutch 16a.

In the case of the above-structured continuously variable transmission apparatus shown in FIG. 13, in a state where the low-speed clutch 31a is connected and the connection of the high-speed clutch 16a is cut off, the power of the input shaft 1 is transmitted through the ring gear 13b to the output shaft 20. And, by changing the speed ratio of the toroidal-type continuously variable transmission unit 11a, the speed ratio of the whole of the continuously variable transmission apparatus can be changed, that is, the speed ratio between the input shaft 1 and output shaft 20 can be changed. In this case, the relationship between the speed ratio of the toroidal-type continuously variable transmission unit 11a and the speed ratio of the whole of the continuously variable transmission apparatus is as shown by a line $\alpha$ in FIG. 14. In this state, the relationship between the two speed ratios is similar to the relationship shown in FIG. 9 of the continuously variable transmission apparatus shown in FIG. 8.

On the other hand, in a state where the connection of the low-speed clutch 31a is cut off and the high-speed clutch 16a is connected, the power of the input shaft 1 is transmitted through the first and second transmission shafts 36, 38 to the output shaft 20. And, by changing the speed ratio of the toroidal-type continuously variable transmission unit 11a, the speed ratio of the whole of the continuously variable transmission apparatus can be changed. In this case, the relationship between the speed ratio of the toroidal-type continuously variable transmission unit 11a and the speed ratio of the whole of the continuously variable transmission apparatus is as shown by a line $\beta$ in FIG. 14. And, as the speed ratio of the toroidal-type continuously variable transmission unit 11a increases, the speed ratio of the whole of the continuously variable transmission apparatus increases. By the way, FIG. 14 shows a case in which the ratio $i_1$ of the teeth number $Z_{39}$ of the sun gear 39a and the teeth number $Z_{13}$ of the ring gear 13b (=$Z_{39}/Z_{13}$) is set for 2, the teeth ratio $i_2$ Of the teeth number of a gear transmission mechanism interposed between the sun gear 21a and sun gear 39a is set for 1.1 (10% speed increase), and the ratio $i_3$ of the teeth number of the sun gear 39b and the teeth number of the second ring gear 43 is set for 2.8.

The structure shown in FIG. 11 and the structure shown in FIG. 13 are able not only to secure the durability of the toroidal-type continuously variable transmission unit 11a but also to obtain a relatively large speed ratio; however, they are troublesome to assemble and are expensive in the manufacturing costs thereof. The reason for this is that the operation to assemble the gear transmission mechanism used to transmit the power of the input shaft 1 to the transmission shaft 34 (FIG. 11) or to the second transmission shaft 38 (FIG. 13) is troublesome. Description will be given below of this reason with reference to the structure shown in FIG. 11.

In the structure shown in FIG. 11, when constituting a gear transmission mechanism for transmission of the power from the hollow rotary shaft 33 to the transmission shaft 34, the planetary gears 22a, 22b supported to the carrier 24b to be coaxial with each other must be meshed with the sun gear 21a fixed to the end portion of the hollow rotary shaft 33 and the gear 35 fixed to the base end portion of the transmission shaft 34, respectively. In this case, when the speed ratio between the sun gear 21a and gear 35 is other than 1, that is, except for a case where the teeth number of the planetary gears 22a and the teeth number of the planetary gears 22b are equal to each other and the teeth number of the sun gear 21a and the teeth number of the gear 35 are equal to each other, it is very troublesome to mesh the gears 22a, 22b, 21a, 35 with each other while matching the phases of the gears 22a, 22b, 21a and 35.

In case where the speed ratio is set for 1, such troublesome operation can be avoided but, in this case, the freedom of the design of the continuously variable transmission apparatus is unfavorably reduced, for example, the speed ratio that can be obtained by the continuously variable transmission apparatus is unfavorably limited. This problem arises quite similarly in the structure shown in FIG. 13 as well.

SUMMARY OF THE INVENTION

The present invention aims at eliminating the above drawbacks found in the conventional continuously variable transmission apparatus. Accordingly, it is an object of the invention to provide a continuously variable transmission apparatus which, while having the advantages of the structures shown in FIGS. 11, 13 as they are, can be assembled easily.

In attaining the above object, according to the invention, there is provided a continuously variable transmission apparatus having a combination of a toroidal-type continuously variable transmission unit and a planetary-gear-type transmission unit, the toroidal-type continuously variable transmission unit comprising:

a first rotary shaft;

a pair of outside disks connected together through the first rotary shaft in such a manner as to be concentric with each other and be rotatable in synchronization with each other;

an inside disk supported between the two outside disks in such a manner as to be concentric with the two outside disks and be rotatable independently of the two outside disks; and, a plurality of power rollers interposed and held by twos or more each between the two side surfaces of the inside disk and the side surfaces of the two outside disks for transmitting power between the inside disk and the two outside disks, the planetary-gear-type transmission unit, comprising:

a carrier concentrically connected and fixed to the pair of outside disks in such a manner as to be rotatable together with the two outside disks;

a plurality of first planetary gears rotatably supported on one of the side surfaces of the carrier facing one of the two outside disks;

a hollow rotary shaft disposed on the periphery of the first rotary shaft;

a first sun gear connected to the inside disk by the hollow rotary shaft in such a manner as to be concentric with the inside disk and the outside disks as well as be rotatable, the first sun gear being meshed with the first planetary gears;

a plurality of second planetary gears rotatably supported on the other side surface of the carrier;

a second sun gear disposed in such a manner as to be concentric with the inside disk and the outside disks as well as be rotatable, the second sun gear being meshed with the second planetary gears; and a ring gear disposed in such a manner as to be concentric with the inside disk and the outside disks as well as be rotatable, the ring gear being meshed with the first planetary gears, the first and second planetary gears being meshed with the single ring gear while the first and second planetary gears are supported on the carrier independently of each other; and, a second rotary shaft supported in such a manner as to be concentric with the first rotary shaft and be rotatable with respect to the first rotary shaft, the second rotary shaft being connected to the second sun gear.

Also, according to the invention, each of the first planetary gears comprises a pair of first planetary gear elements meshed with each other, one of the first planetary gear elements is meshed with the first sun gear, the other is meshed with the ring gear rotatably supported on the periphery of the first sun gear, and wherein the planetary-gear-type transmission unit, includes:

a transmission shaft disposed concentrically with the first rotary shaft; and a power transmission member for driving and rotating the second rotary shaft directly or through a gear mechanism, and the power transmission member is connectable to one of the ring gear and the transmission shaft.

Further, according to the invention, each of the second planetary gears comprises a pair of second planetary gear elements meshed with each other, one of the second planetary gear elements is meshed with the second sun gear, a difference between the teeth number of the ring gear and the teeth number of the first sun gear as well as a difference between the teeth number of the ring gear and the teeth number of the second sun gear are both the integer multiples of the number of the first and second planetary gears, and the first and second planetary gear elements to be meshed with the ring gear are united as an integral body.

According to the above-structured continuously variable transmission apparatus of the invention, similarly to the conventional structures shown in FIGS. 11 and 13, not only the durability of the toroidal-type continuously variable transmission unit can be secured but also a relatively large speed ratio can be obtained. Also, the first and second planetary gears are supported on the carrier in such a manner that they are independent of each other; and, the power transmission between the first and second sun gears is carried out through the first and second planetary gears and ring gear. This can facilitate the operation to match the phases of these gears to each other. Therefore, the assembling operation of the continuously variable transmission apparatus can be facilitated, which can reduce the manufacturing cost of the continuously variable transmission apparatus.

DETAILED DESCRIPTION OF THE PREFERRED EMBODIMENTS

Figure 1:
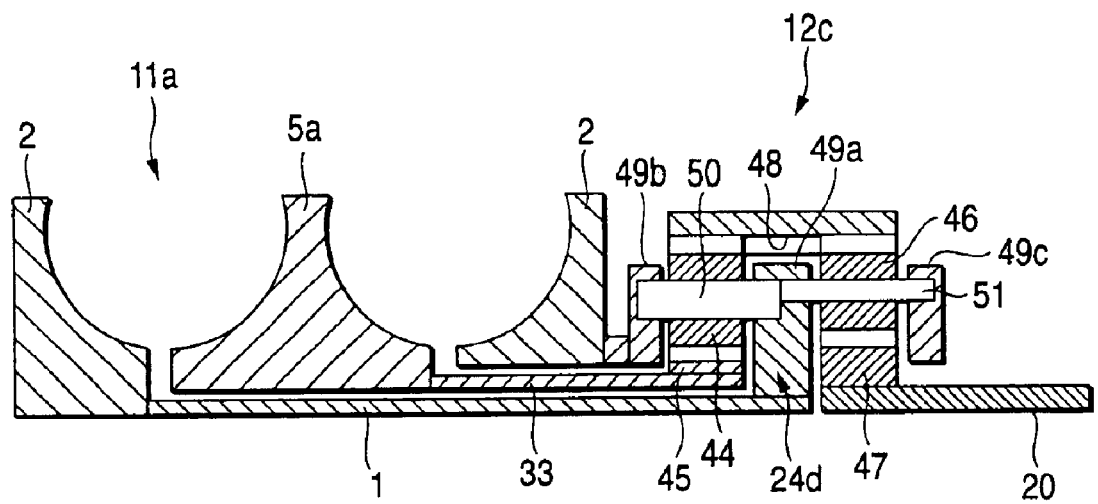
FIG. 1 is a schematic section view of a half section of a first embodiment of a continuously variable transmission apparatus according to the invention.

FIG. 1 shows a first embodiment of a continuously variable transmission apparatus according to the invention. The continuously variable transmission apparatus according to the present embodiment is composed of a combination of a toroidal-type continuously variable transmission unit 11a and a planetary-gear-type transmission unit 12c.

The toroidal-type continuously variable transmission unit 11a, similarly to the previously described conventional structures, includes a pair of input side disks 2, 2 respectively serving as outside disks, an integrally formed output side disk 5a serving as an inside disk, and a plurality of power rollers 6, 6 (see FIGS. 6, 8, 11, 13). And, the pair of input side disks 2, 2 are connected to each other through an input shaft 1 serving as a first rotary shaft in such a manner that they are concentric with each other and can be rotated in synchronization with each other. Also, the output side disk 5a is supported between the two input side disks 2, 2 in such a manner that it is concentric with these input side disks 2, 2 and can be rotated with respect to the input side disks 2, 2. Further, the power rollers 6, 6 are held by twos or more each between the two side surfaces of the output side disk 5a and the side surfaces of the input side disks 2, 2. And, the power rollers 6, while being rotated as the two input side disks 2, 2 are rotated, transmit the power from the two input side disks 2, 2 to the output side disk 5a.

On the other hand, the planetary-gear-type transmission unit 12c includes a carrier 24d, a plurality of first planetary gears 44, a first sun gear 45, a plurality of second planetary gears 46, a second sun gear 47, and a ring gear 48.

The carrier 24d is concentrically connected and fixed to the pair of input side disks 2, 2 and can be rotated together with these two input side disks 2, 2. That is, the carrier 24d includes three support plates 49a, 49b and 49c each formed in a ring shape, while the centrally situated support plate 49a is connected and fixed to the end portion of the input shaft 1. On the other hand, the support plate 49b, which is situated nearest to the toroidal-type continuously variable transmission unit 11a (in FIG. 1, the left support plate), is connected and fixed to the outer side surface (in FIG. 1, the right side surface) of one (in FIG. 1, the right) input side disk 2. And, the pair of support plates 49a and 49b are disposed such that they are parallel to each other and are both concentric with the input shaft 1; and, a plurality of portions (generally, three or four portions) of the support plates 49a and 49b which are disposed at equal intervals with respect to the circumferential direction thereof are connected and fixed to each other by first connecting shafts 50 which are disposed in parallel to the input shaft 1. The first planetary gears 44 are rotatably supported on the periphery of the first connecting shaft 50 through a radial needle roller bearing (not shown). In the present embodiment, the first planetary gears 44 are respectively planetary gears of a single pinion type.

Also, the first sun gear 45 is connected to the output side disk 5a by a hollow rotary shaft 33. The output side disk 5a is disposed on the periphery of the input shaft 1 in such a manner that it is concentric with the input shaft 1 and can be rotated with respect to the input shaft 1. And, the base end portion (in FIG. 1, the left end portion) of the hollow rotary shaft 33 is connected and fixed to the central portion of the output side disk 5a, while the first sun gear 45 is fixed to the outer peripheral surface of the leading end portion of the hollow rotary shaft 33. Therefore, the first sun gear 45 can be rotated in synchronization with the output side disk 5a. The thus structured first sun gear 45 is in meshing engagement with the first planetary gears 44.

Also, a plurality of portions (generally, three or four portions) of the centrally situated support plate 49a and the support plate 49c (which is situated most distant from the toroidal-type continuously variable transmission unit 11a (in FIG. 1, the right support plate)) respectively constituting the carrier 24d, that are disposed at equal intervals with respect to the circumferential direction thereof are connected and fixed to each other by their associated second connecting shafts 51 which are respectively disposed in parallel to the input shaft 1. The second planetary gears 46 are rotatably supported on the peripheries of their associated second connecting shafts 51 through their associated radial needle roller bearings (not shown).

Also, the base end portion (in FIG. 1, the left end portion) of an output shaft 20 serving as a second rotary shaft, which is supported concentrically with the input shaft 1 and can be rotated with respect to the input shaft 1, is inserted into the interior of the second planetary gears 46. The second sun gear 47 is fixedly disposed on the base end portion of the output shaft 20; and, the second sun gear 47 and second planetary gears 46 are meshed with each other.

Further, the first planetary gears 44 and second planetary gears 46 are respectively in meshing engagement with the ring gear 48. The ring gear 48 is disposed in such a manner that it is concentric with the input side and output side disks 2, 5a constituting the toroidal-type continuously variable transmission unit 11a and can be rotated freely. Thanks to this structure, the rotation power of the input shaft 1 can be transmitted through the carrier 24d, second planetary gears 46 and second sun gear 47 to the output shaft 20. Also, the rotation power of the output side disk 5a can be transmitted through the hollow rotary shaft 33, first sun gear 45 and first planetary gears 44 to the carrier 24d, so that the rotation speed of the carrier 24d can be controlled.

According to the above-structured continuously variable transmission apparatus of the invention, by controlling the speed ratio between the input side disks 2, 2 and output side disk 5a in the toroidal-type continuously variable transmission unit 11a portion thereof, that is, the transmission ratio (CVU speed ratio) of the toroidal-type continuously variable transmission unit 11a, the speed ratio between the input shaft 1 and output shaft 20, that is, the transmission ratio (T/M speed ratio) of the whole of the continuously variable transmission apparatus can be changed. In other words, the rotation power of the input shaft 1 is transmitted through the carrier 24d, second planetary gears 46 and second sun gear 47 to the output shaft 20 and, the speed ratio in this case can be changed according to the revolving speed around the sun gear 47 of the second planetary gears 46. And, the revolving speed around the sun gear 47 of the second planetary gears 46 can be changed by controlling the speed ratio of the toroidal-type continuously variable transmission unit 11a.

For example, where the speed ratio of the toroidal-type continuously variable transmission unit 11a is expressed as $e_{CVU}$, the teeth number of the first sun gear 45 is expressed as $Z_{S1}$ and the teeth number of the second sun gear 47 is expressed as $Z_{S2}$, the speed ratio $e_{CVT}$ of the whole of the continuously variable transmission apparatus can be expressed by the following equation (1).

$$e_{CVT} = 1 + (Z_{S1}/Z_{S2}) \times (e_{CVU} - 1) \tag{1}$$

Also, where an input torque to be applied to the continuously variable transmission apparatus is expressed as $T_{IN}$, an input torque $T_{CVU}$ to be applied to the pair of input side disks 2, 2 constituting the toroidal-type continuously variable transmission unit 11a can be expressed by the following equation (2).

$$T_{CVU} = T_{IN} \times (Z_{S1} \times e_{CVU}) / (Z_{S2} - Z_{S1} + Z_{S1} \times e_{CVU}) \tag{2}$$

In the equation (2), since the value of $e_{CVU}$ is a negative value, in case where the teeth number $Z_{S1}$ of the first sun gear 45 is set larger than the teeth number $Z_{S2}$ of the second sun gear 47 ($Z_{S1} > Z_{S2}$), it can be found that the input torque $T_{CVU}$ to the pair of input side disks 2, 2 can be made smaller than the input torque $T_{IN}$ to the continuously variable transmission apparatus ($T_{CVU} < T_{IN}$)

Figure 2:
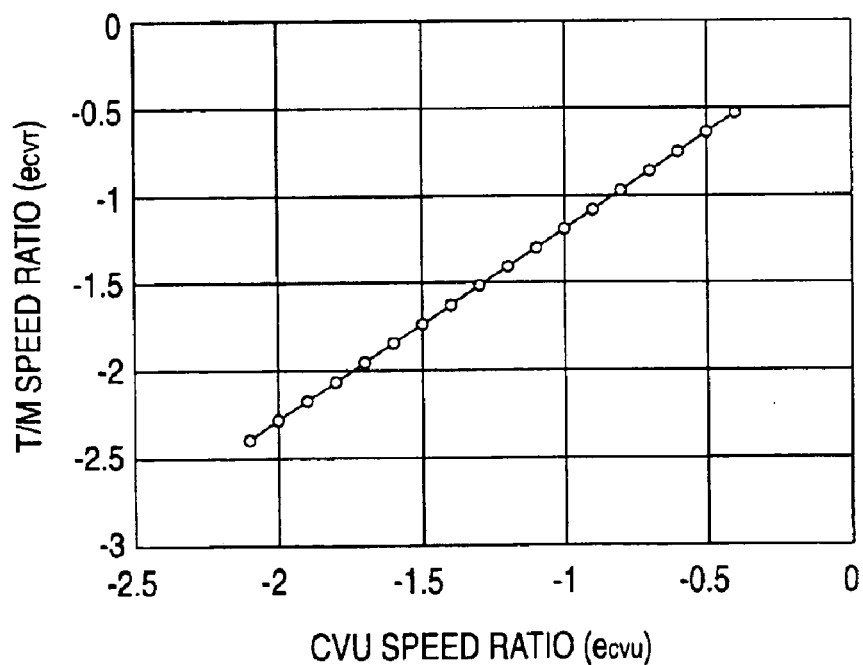
FIG. 2 is a graphical representation of the relationship between the speed ratio of a toroidal-type continuously variable transmission unit and the speed ratio of the whole of the continuously variable transmission apparatus in the first embodiment.
Figure 12:
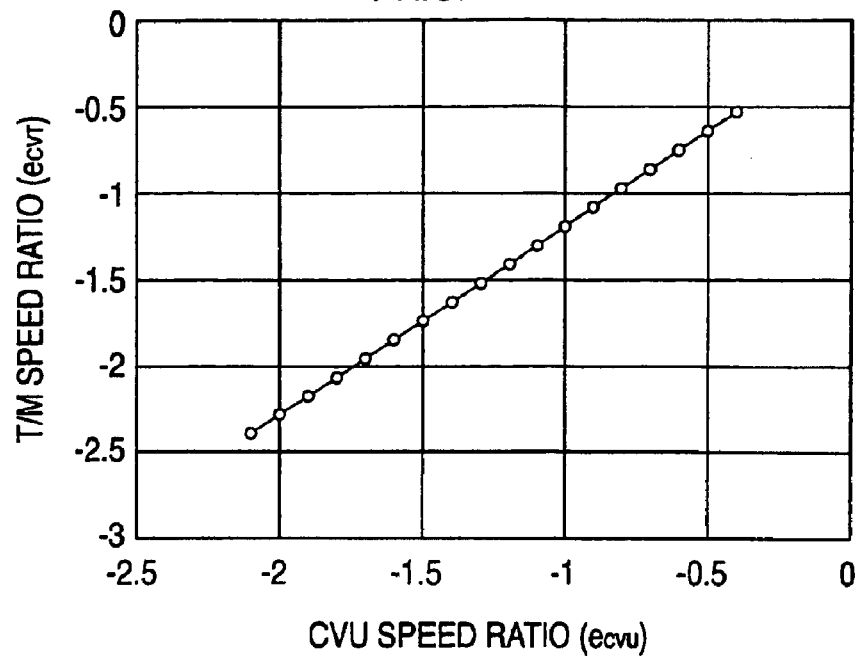
FIG. 12 is a graphical representation of the relationship between the speed ratio of a toroidal-type continuously variable transmission unit and the speed ratio of the whole of the continuously variable transmission apparatus in the third conventional example.

For example, FIG. 2 shows the relationship between the speed ratio $e_{CVU}$ of the toroidal-type continuously variable transmission unit 11a and the speed ratio $e_{CVT}$ of the whole of the continuously variable transmission apparatus in case where the ratio of the teeth number of the ring gear 48 to the teeth number $Z_{S1}$ of the first sun gear 45 is set for 2 and the ratio of the teeth number of the ring gear 48 to the teeth number $Z_{S2}$ of the second sun gear 47 is set for 2.2 ($Z_{S1}/Z_{S2}=1.1$) FIG. 2 shows the characteristic of the present embodiment which is substantially similar to the characteristic shown in FIG. 12.

Figure 11:
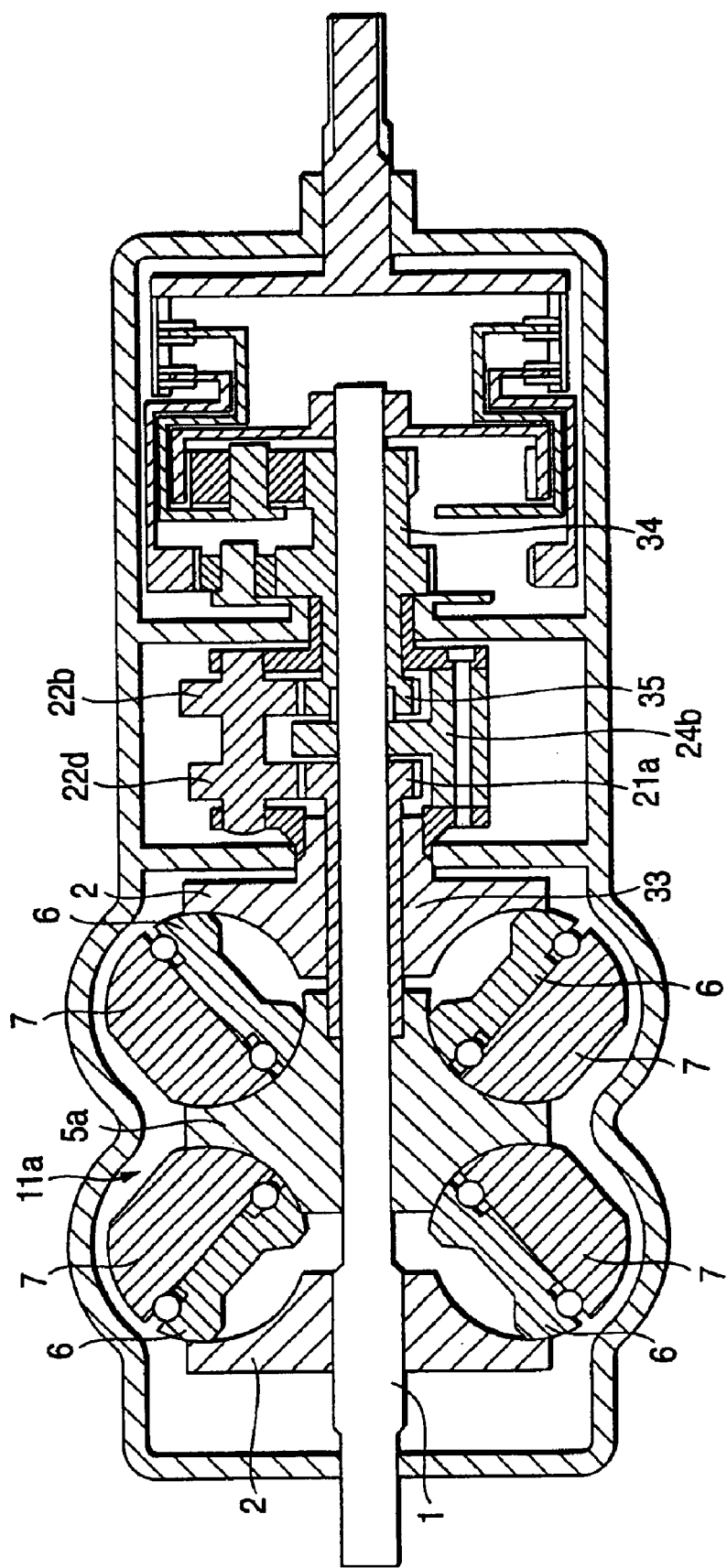
FIG. 11 is a schematic section view of a third example of a conventional continuously variable transmission apparatus composed of a combination of a toroidal-type continuously variable transmission unit and a planetary-gear-type transmission unit.

As can be seen clearly from the above equation (2), according to the present structure, similarly to the conventional structure shown in FIG. 11, the durability of the toroidal-type continuously variable transmission unit can be secured.

Especially, according to the present structure, there is employed a structure in which the first and second planetary gears 44, 46 are supported on the carrier 24d independently of each other and the power transmission between the first and second sun gears 45 and 47 is executed through the first and second planetary gears 44, 46 and ring gear 48. That is, differently from the conventional structure shown in FIG. 11, the first and second planetary gears 44, 46 are not connected or fixed to each other. This can facilitate the operation to match the phases of the first and second planetary gears 44, 46, the first and second sun gears 45, 47 and ring gear 48 to each other. Therefore, the operation to assemble the continuously variable transmission apparatus can be facilitated and thus the manufacturing cost thereof can be reduced.

Figure 3:
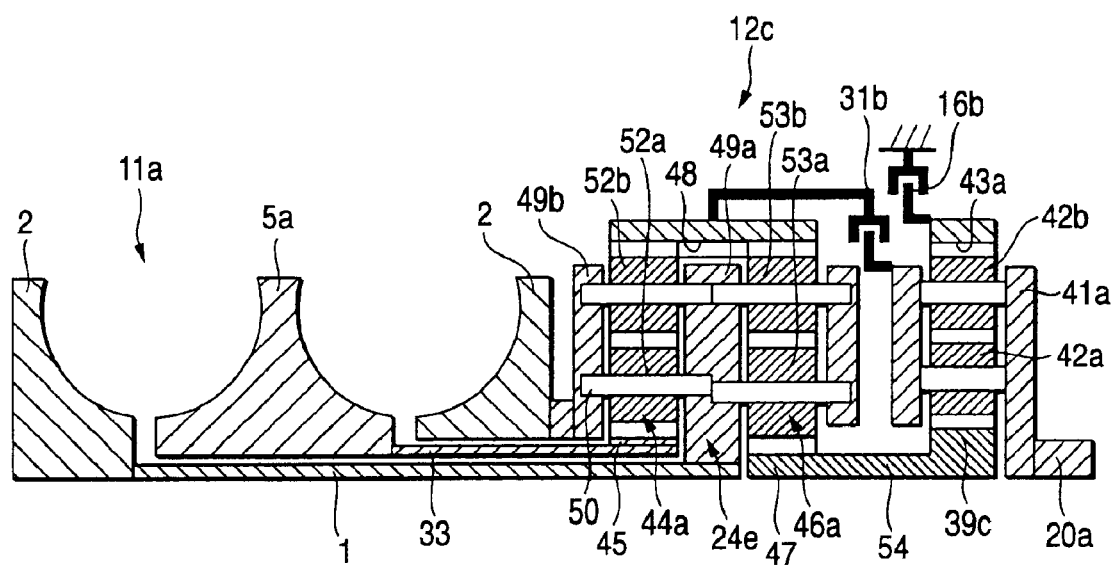
FIG. 3 is a schematic section view of a half section of a second embodiment of a continuously variable transmission apparatus according to the invention.
Figure 13:
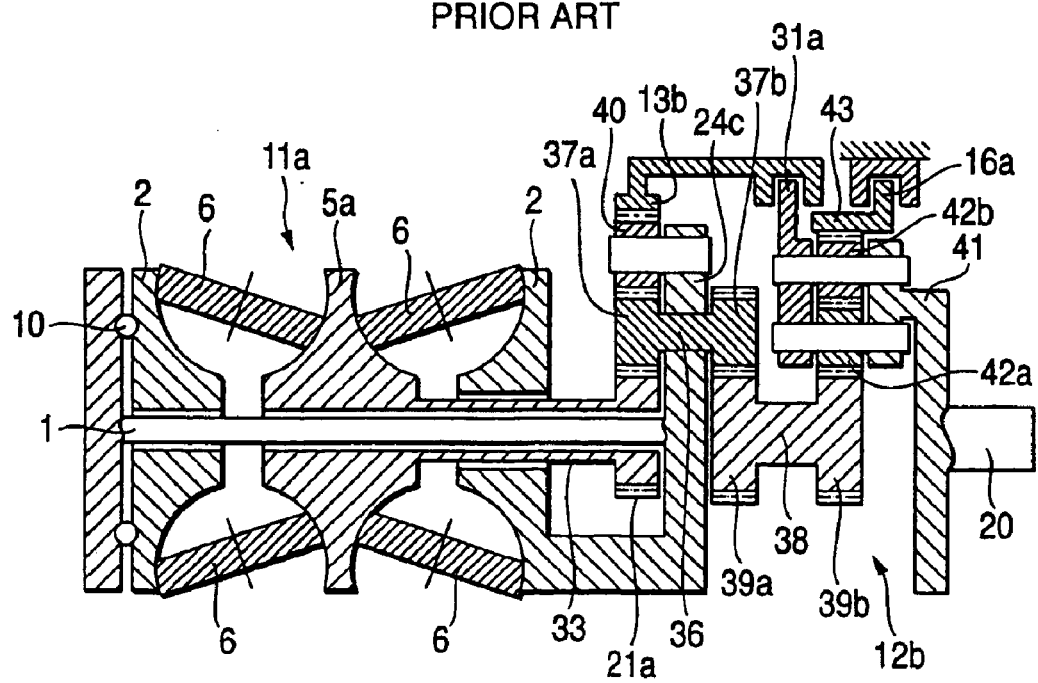
FIG. 13 is a schematic section view of a fourth example of a conventional continuously variable transmission apparatus composed of a combination of a toroidal-type continuously variable transmission unit and a planetary-gear-type transmission unit.

Next, FIG. 3 shows a second embodiment of a continuously variable transmission apparatus according to the invention. In the second embodiment, the structure shown in FIG. 13 is improved to thereby be able not only to secure the same function as the structure shown in FIG. 13 but also to enhance the assembling efficiency thereof.

According to the present embodiment, the radial-direction (in FIG. 3, the vertical direction) width dimension of a carrier 24e, which can be rotated together with an input shaft 1 and a pair of input side disks 2, 2, is set larger than that of the previously described first embodiment. And, on the thus structured carrier 24e, there are supported first and second planetary gears 44a, 46a which are respectively gears of a double pinion type. That is, these planetary gears 44a, 46a are respectively composed of a pair of planetary gear elements 52a, 52b and 53a, 53b. And, the paired planetary gear elements 52a, 52b and 53a, 53b are meshed with each other; and, the inside-diameter side planetary gear elements 52a, 53a are respectively meshed with first and second sun gears 45, 47 which are fixed to a hollow rotary shaft 33 and a transmission shaft 54 disposed concentrically with the input shaft 1, while the outside-diameter side planetary gear elements 52b, 53b are respectively in meshing engagement with a ring gear 48.

On the other hand, a second carrier 41a is disposed on the periphery of a sun gear 39c which is fixed to the other end portion (in FIG. 3, the right end portion) of the transmission shaft 54 and, on the second carrier 41a, there are rotatably supported planetary gear elements 42a, 42b. By the way, the second carrier 41a is fixed to the base end portion (in FIG. 3, the left end portion) of an output shaft 20a which is disposed so as to be concentric with the input shaft 1. Also, the planetary gear elements 42a, 42b are meshed with each other; and, one planetary gear element 42a is meshed with the sun gear 39c, while the other planetary gear element 42b is meshed with a second ring gear 43a which is rotatably disposed on the periphery of the second carrier 41a. Also, the ring gear 48 and second carrier 41a can be engaged with and removed from each other by a low-speed clutch 31b, while the second ring gear 43a and a fixed portion such as a housing can be engaged with and removed from each other by a high-speed clutch 16b.

In the case of the thus structured continuously variable transmission apparatus according to the present embodiment, in case where the low-speed clutch 31b is connected and the connection of the high-speed clutch 15b is cut off, the power of the input shaft 1 is transmitted through the ring gear 48 to the output shaft 20a. And, by changing the speed ratio of the toroidal-type continuously variable transmission unit 11a, the speed ratio $e_{CVT}$ of the whole of the continuously variable transmission apparatus, that is, the speed ratio between the input shaft 1 and output shaft 20a can be changed. The relationship between the speed ratio $e_{CVU}$ of the toroidal-type continuously variable transmission unit 11a and the speed ratio $e_{CVT}$ of the whole of the continuously variable transmission apparatus can be expressed by the following equation (3) in case where the ratio of the teeth number $Z_{48}$ of the ring gear 48 to the teeth number $Z_{45}$ of the first sun gear 45 is expressed as $i_1(=Z_{48}/Z_{45})$.

$$e_{CVT}=(e_{CVU}+i_1-1)/i_1 \quad (3)$$

Figure 4:
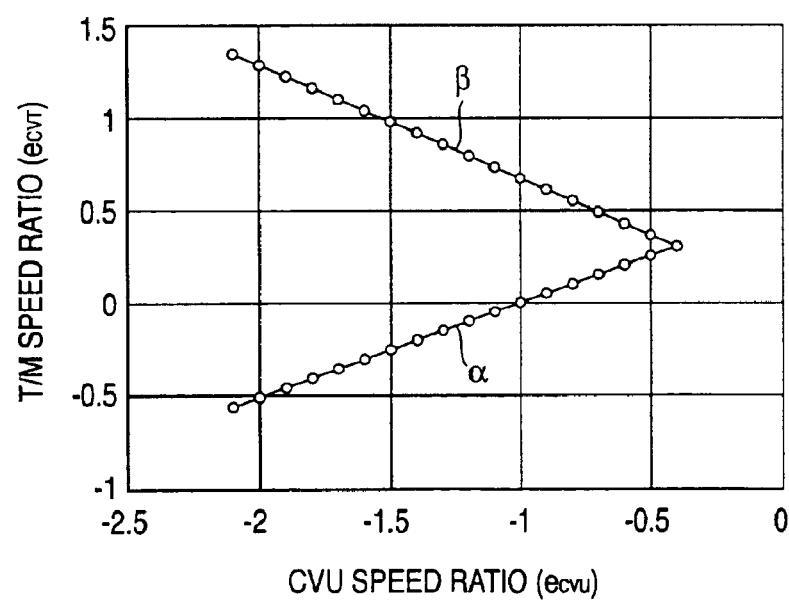
FIG. 4 is a graphical representation of the relationship between the speed ratio of a toroidal-type continuously variable transmission unit and the speed ratio of the whole of the continuously variable transmission apparatus in the second embodiment.

And, the relationship between the two speed ratios $e_{CVU}$ and $e_{CVT}$ is as shown by the line α in FIG. 4.

On the other hand, in case where the connection of the low-speed clutch 31b is cut off and the high-speed clutch 16b is connected, the power of the input shaft 1 is transmitted through the first planetary gear 44a, ring gear 48, second planetary gear 46a, transmission shaft 54, planetary gear elements 42a, 42b and second carrier 41a to the output shaft 20a. And, by changing the speed ratio $e_{CVU}$ of the toroidal-type continuously variable transmission unit 11a, the speed ratio $e_{CVT}$ of the whole of the continuously variable transmission apparatus can be changed. In this case, the relationship between the speed ratio $e_{CVU}$ of the toroidal-type continuously variable transmission unit 11a and the speed ratio $e_{CVT}$ of the whole of the continuously variable transmission apparatus can be expressed by the following equation (4). By the way, in the equation (4), $i_1$ expresses the ratio of the teeth number $Z_{48}$ of the ring gear 48 to the teeth number $Z_{45}$ of the first sun gear 45 ($Z_{48}/Z_{45}$) $i_2$ expresses the ratio of the teeth number $Z_{48}$ of the ring gear 48 to the teeth number $Z_{47}$ of the second sun gear 47 ($Z_{48}/Z_{47}$), and $i_3$ expresses the ratio of the teeth number $Z_{43}$ of the second ring gear 43a to the teeth number $Z_{39}$ of the sun gear 39c ($Z_{43}/Z_{39}$) respectively.

$$e_{CVT}=\{1/(1-i_3)\}\times\{1+(i_2/i_1)\times(e_{CVU}-1)\} \quad (4)$$

And, the relationship between the two speed ratios $e_{CVU}$ and $e_{CVT}$ is as shown by the line β in FIG. 4. In this case, as the speed ratio of the toroidal-type continuously variable transmission unit 11a increases, the speed ratio of the whole of the continuously variable transmission apparatus increases. By the way, FIG. 4 shows a case where the ratio $i_1$ of the teeth number $Z_{48}$ of the ring gear 48 to the teeth number $Z_{45}$ of the first sun gear 45 is set for 2, the ratio $i_2$ of the teeth number $Z_{48}$ of the ring gear 48 to the teeth number $Z_{47}$ of the second sun gear 47 is set for 2.2, and the ratio $i_3$ of the teeth number $Z_{43}$ of the second ring gear 43a to the teeth number $Z_{39}$ of the sun gear 39c is set for 2.8.

Figure 14:
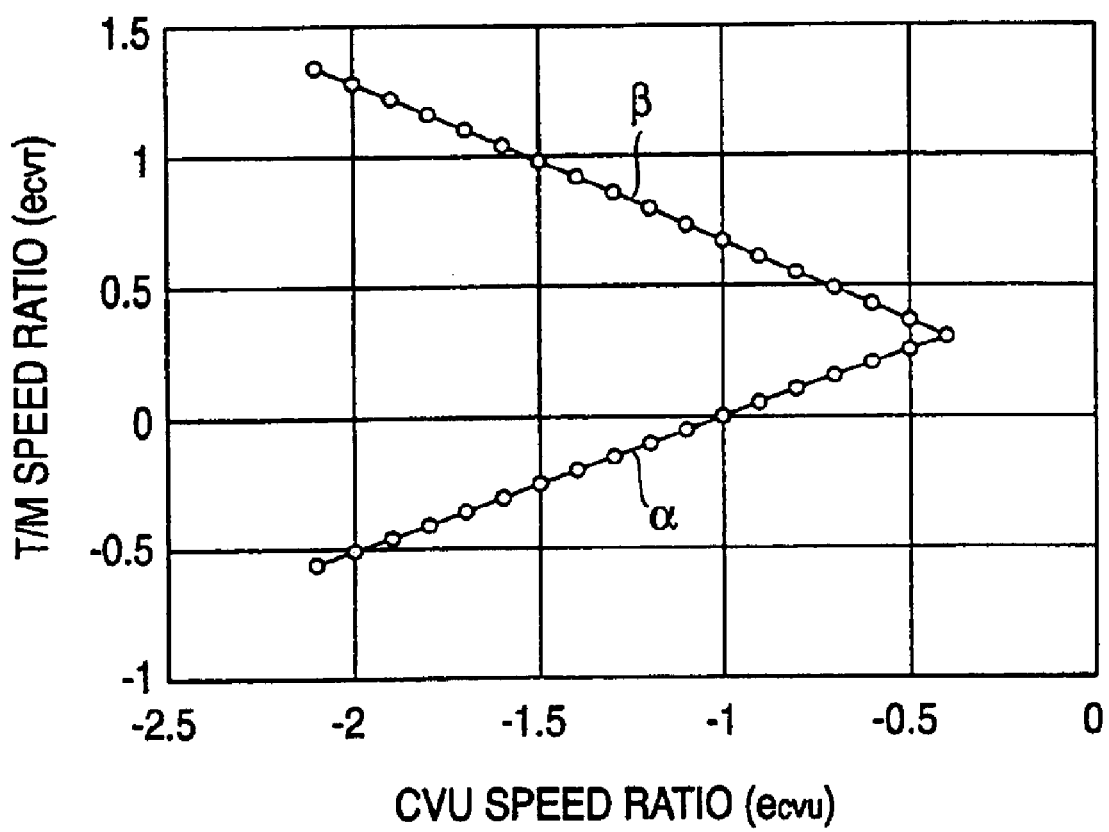
FIG. 14 is a graphical representation of the relationship between the speed ratio of a toroidal-type continuously variable transmission unit and the speed ratio of the whole of the continuously variable transmission apparatus in the fourth conventional example; and, FIG. 15 is a schematic section view of a half section of a modification of the third embodiment of a continuously variable transmission apparatus according to the invention.

The relationship between the two speed ratios $e_{CVU}$ and $e_{CVT}$ shown in FIG. 4 is the same as the relationship between the two speed ratios $e_{CVU}$ and $e_{CVT}$ shown in the previously discussed FIG. 14 in the conventional structure shown in FIG. 13. However, in the case of the present embodiment, similarly to the previously described first embodiment, it is easy to match the phases of the respective gears to each other, which can enhance the efficiency of the manufacturing operation of the continuously variable transmission apparatus and thus can reduce the manufacturing cost thereof.

Figure 5:
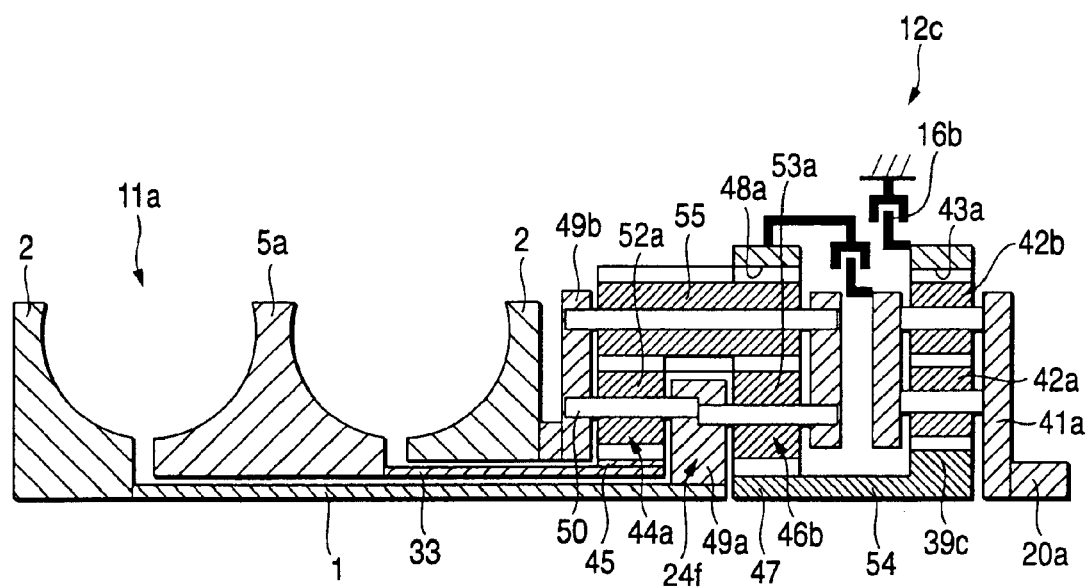
FIG. 5 is a schematic section view of a half section of a third embodiment of a continuously variable transmission apparatus according to the invention.
Figure 6:
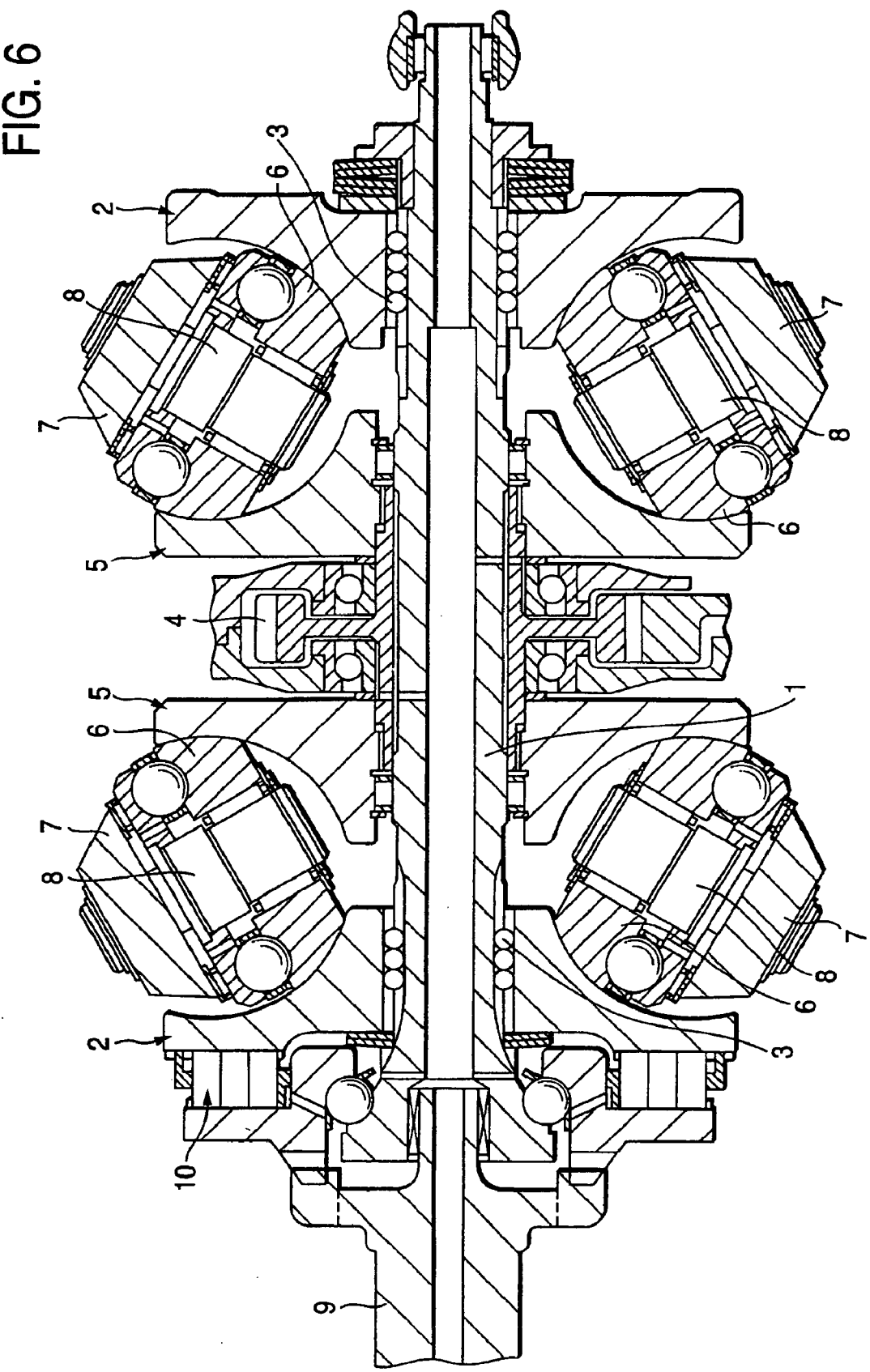
FIG. 6 is a section view of an example of a conventional toroidal-type continuously variable transmission unit.
Figure 7:
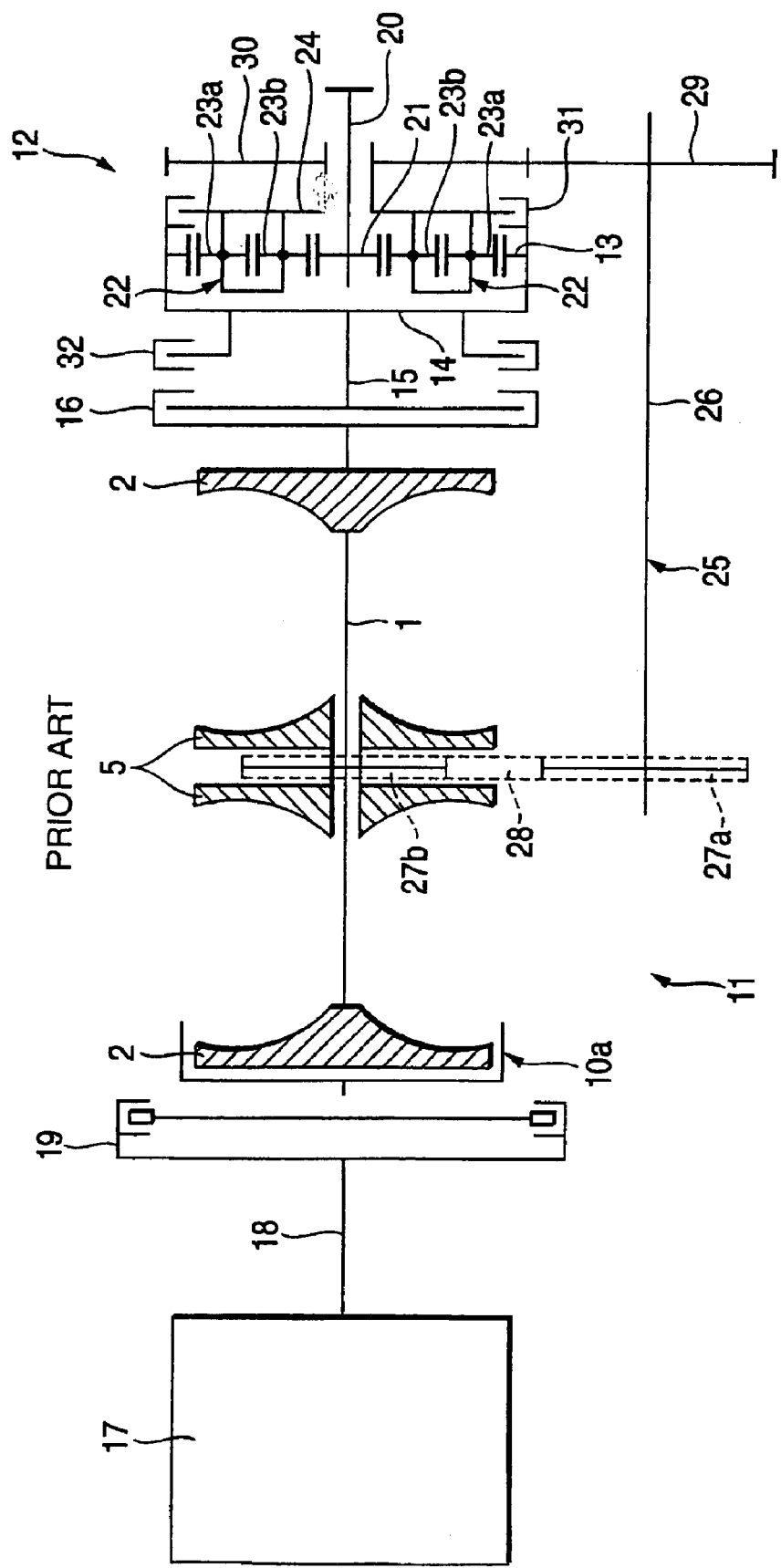
FIG. 7 is a schematic section view of a first example of a conventional continuously variable transmission apparatus composed of a combination of a toroidal-type continuously variable transmission unit and a planetary-gear-type transmission unit.
Figure 8:
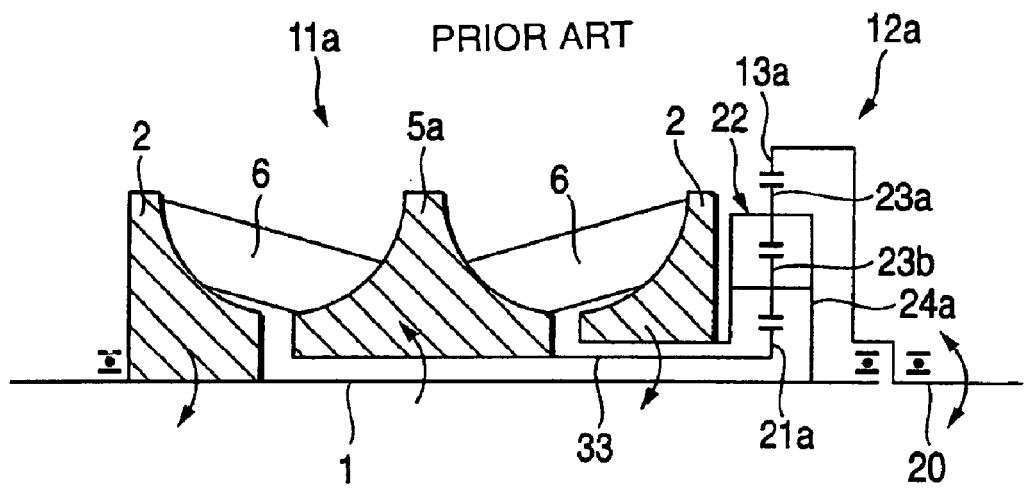
FIG. 8 is a schematic section view of a half section of a second example of a conventional continuously variable transmission apparatus of the above type.
Figure 9:
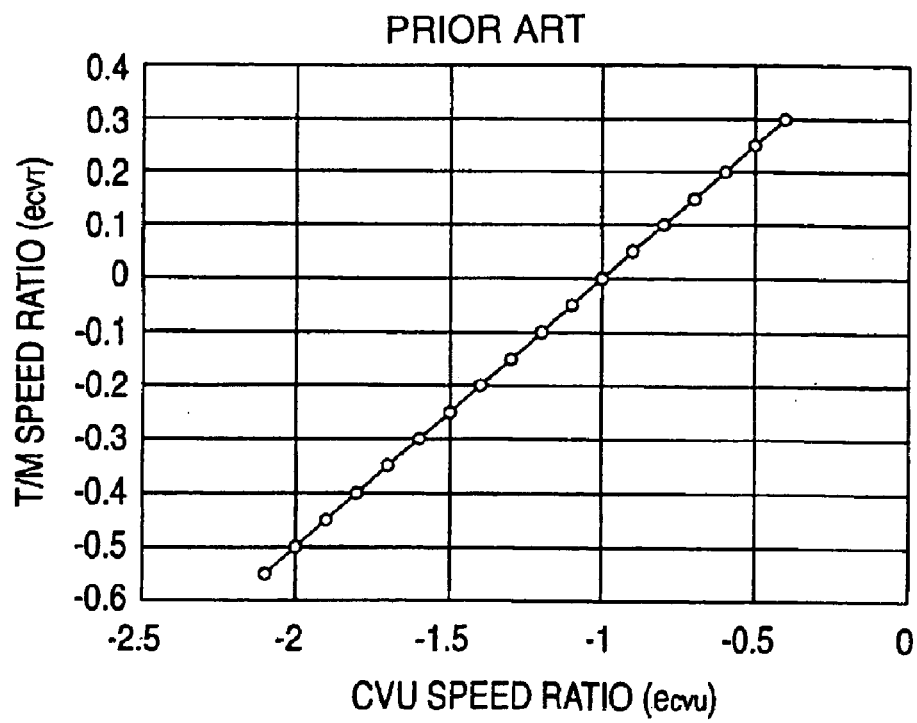
FIG. 9 is a graphical representation of the relationship between the speed ratio of a toroidal-type continuously variable transmission unit and the speed ratio of the whole of the continuously variable transmission apparatus in the second conventional example.
Figure 10:
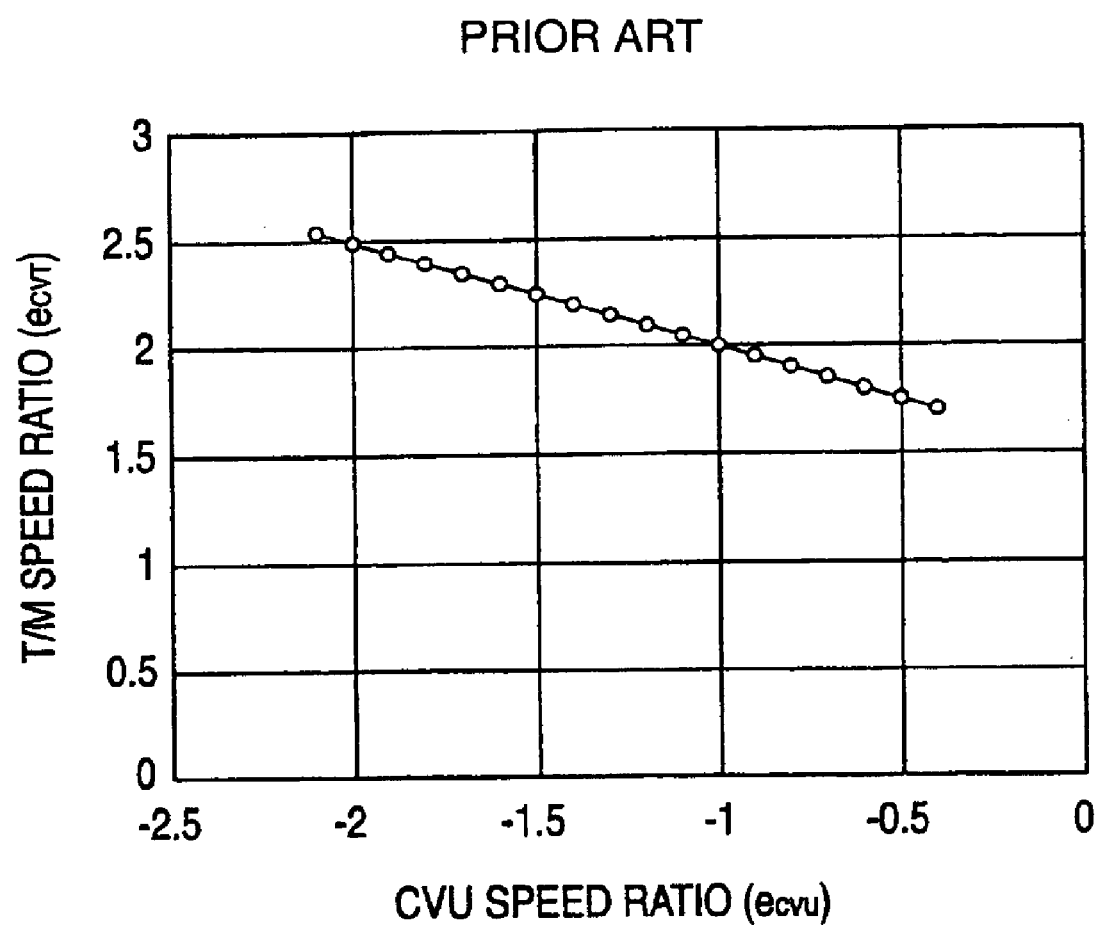
FIG. 10 is a graphical representation of the relationship between the speed ratio of a toroidal-type continuously variable transmission unit and the speed ratio of the whole of the continuously variable transmission apparatus in the second conventional example, in case where the planetary gears constituting the planetary-gear-type transmission unit are respectively of a single pinion type.

Next, FIG. 5 shows a third embodiment of a continuously variable transmission apparatus according to the invention. According to the present embodiment, by improving the structures of first and second planetary gears 44b, 46b supported on a carrier 24f which can be rotated together with an input shaft 1 and a pair of input side disks 2, 2, the weight of the present continuously variable transmission apparatus can be reduced when compared with the second embodiment. That is, in the case of the present embodiment, each of the first and second planetary gears 44b, 46b is composed of a pair of planetary gear elements and, of these planetary gear elements, as a planetary gear element 55 which is situated outside with respect to the diameter direction of the carrier 24f, there is used a planetary gear element which is long in the axial direction dimension. And, planetary gear elements 52a, 53a, which constitute the first and second planetary gears 44b, 46b and are situated inside with respect to the diameter direction of the carrier 24f, are respectively meshed with first and second sun gears 45, 47 and are also meshed with the planetary gear element 55. Further, the planetary gear element 55 is also meshingly engaged with a ring gear 48a which is small in the width dimension with respect to the axial direction (in FIG. 5, the right and left direction) thereof.

In the case of the thus structured continuously variable transmission apparatus according to the present embodiment, by reducing the width dimension of the ring gear 48a which is large in diameter, the weight of the present continuously variable transmission apparatus can be reduced. Also, the number of parts such as planetary gear elements, shafts and bearings used to support the planetary gear elements can be reduced, which can simplify parts machining operations, parts management and assembling operation, thereby being able to reduce the manufacturing cost of the continuously variable transmission apparatus.

However, in case where the structure according to the present embodiment is used, not only a difference between the teeth number $Z_{48}$ of the ring gear 48 and the teeth number $Z_{45}$ of the first sun gear 45 ($Z_{48}$–$Z_{45}$) but also a difference between the teeth number $Z_{48}$ of the ring gear 48 and the teeth number $Z_{47}$ of the second sun gear 47 ($Z_{48}$–$Z_{47}$) must be the integer multiples of the number n (normally, 3 or 4) of the first and second planetary gears 44b, 46b. That is, in case where k is used to express a natural number, ($Z_{48}$–$Z_{45}$)=k×n and ($Z_{48}$–$Z_{47}$)=k×n must hold. The reason for this is to be able to engage the gears 45, 47, 44b, 46b with each other positively.

In the case of the thus structured continuously variable transmission apparatus according to the present embodiment, the operation to transmit the power between the input shaft 1 and output shaft 20a is similar to the second embodiment.

While only certain embodiments of the invention have been specifically described herein, it will apparent that numerous modifications may be made thereto without departing from the spirit and scope of the invention.

Figure 15:
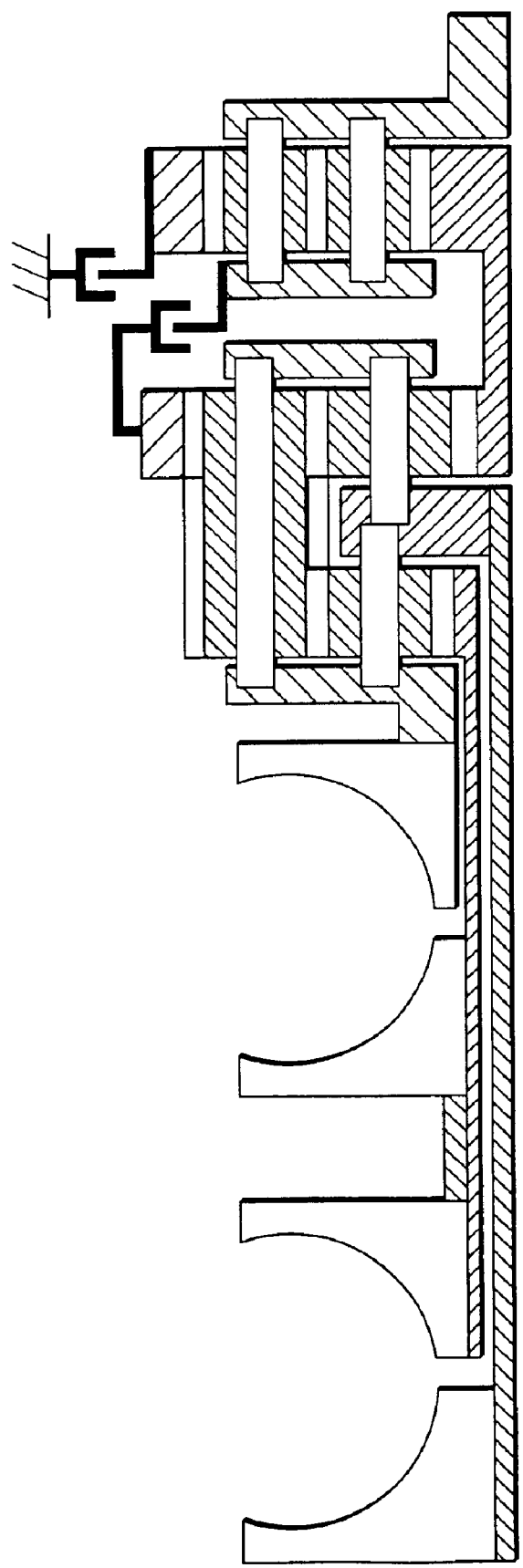

In the above embodiments, although the inside disk is explained by an output disk of an integral type, the inside disk may be constructed with a pair of output disks shown in FIG. 15.

Since the invention is structured and operated in the above-mentioned manner, not only the securement of the durability of a toroidal-type continuously variable transmission unit to be incorporated into a continuously variable transmission apparatus having a large speed ratio and the reduction of the size and weight of the continuously variable transmission apparatus are compatible with each other on a high level, but also the assembling operation of a planetary-gear-type transmission unit portion thereof can be facilitated. As a result of this, the invention can reduce the manufacturing cost of a continuously variable transmission apparatus which has a large speed ratio, is small in size and light in weight, and has excellent durability. Thus, the invention can contribute toward realization of such continuously variable transmission apparatus.

What is claimed is:

1. A continuously variable transmission apparatus having a combination of a toroidal-type continuously variable transmission unit and a planetary-gear-type transmission unit, said toroidal-type continuously variable transmission unit comprising:

a first rotary shaft;

a pair of outside disks connected together through said first rotary shaft in such a manner as to be concentric with each other and be rotatable in synchronization with each other;

at least one inside disk supported between said two outside disks in such a manner as to be concentric with said two outside disks and be rotatable independently of said two outside disks; and, a plurality of power rollers interposed and held by two or more each between the two side surfaces of said inside disk and the side surfaces of said two outside disks for transmitting power between said inside disk and said two outside disks, said planetary-gear-type transmission unit, comprising:

a carrier concentrically connected and fixed to said pair of outside disks in such a manner as to be rotatable together with said two outside disks;

a plurality of first planetary gears rotatably supported on one of the side surfaces of said carrier facing one of said two outside disks;

a hollow rotary shaft disposed on the periphery of said first rotary shaft;

a first sun gear connected to said inside disk by said hollow rotary shaft in such a manner as to be concentric with said inside disk and said outside disks as well as be rotatable, said first sun gear being meshed with said first planetary gears;

a plurality of second planetary gears rotatably supported on the other side surface of said carrier;

a second sun gear disposed in such a manner as to be concentric with said inside disk and said outside disks as well as be rotatable, said second sun gear being meshed with said second planetary gears; and a single ring gear disposed in such a manner as to be concentric with said inside disk and said outside disks as well as be rotatable, said first and second planetary gears being meshed with said single ring gear while said first and second planetary gears are supported on said carrier independently of each other; and, a second rotary shaft supported in such a manner as to be concentric with said first rotary shaft and be rotatable with respect to said first rotary shaft, said second rotary shaft being connected to said second sun gear.

2. The continuously variable transmission apparatus as set forth in claim 1, wherein said inside disk is integrally formed by a single unit having said two side surfaces.

3. The continuously variable transmission apparatus as set forth in claim 1, wherein said inside disk comprises a pair of inside disks, each of which has each of said two side surfaces.

4. The continuously variable transmission apparatus as set forth in claim 1, wherein each of said first planetary gears comprises a pair of first planetary gear elements meshed with each other, one of said first planetary gear elements is meshed with said first sun gear, the other is meshed with said ring gear rotatably supported on the periphery of said first sun gear, and wherein said planetary-gear-type transmission unit comprises:

a transmission shaft disposed concentrically with said first rotary shaft; and a power transmission member for driving and rotating said second rotary shaft directly or through a gear mechanism, and said power transmission member is connectable to one of said ring gear and said transmission shaft.

5. The continuously variable transmission apparatus as set forth in claim 4, wherein each of said second planetary gears comprises a pair of second planetary gear elements meshed with each other, one of said second planetary gear elements is meshed with said second sun gear, a difference between the teeth number of said ring gear and the teeth number of said first sun gear as well as a difference between the teeth number of said ring gear and the teeth number of said second sun gear are both the integer multiples of the number of said first and second planetary gears, and said first and second planetary gear elements to be meshed with said ring gear are united as an integral body.

6. A continuously variable transmission apparatus having a combination of a toroidal-type continuously variable transmission unit and a planetary-gear-type transmission unit, said toroidal-type continuously variable transmission unit comprising:

a first rotary shaft;

a pair of outside disks connected together through said first rotary shaft in such a manner as to be concentric with each other and be rotatable in synchronization with each other;

at least one inside disk supported between said two outside disks in such a manner as to be concentric with said two outside disks and be rotatable independently of said two outside disks; and, a plurality of power rollers interposed and held by two or more each between the two side surfaces of said inside disk and the side surfaces of said two outside disks for transmitting power between said inside disk and said two outside disks, said planetary-gear-type transmission unit, comprising:

a carrier concentrically connected and fixed to said pair of outside disks in such a manner as to be rotatable together with said two outside disks;

a plurality of first planetary gears rotatably supported on one of the side surfaces of said carrier facing one of said two outside disks;

a hollow rotary shaft disposed on the periphery of said first rotary shaft;

a first sun gear connected to said inside disk by said hollow rotary shaft in such a manner as to be concentric with said inside disk and said outside disks as well as be rotatable, said first sun gear being meshed with said first planetary gears;

a plurality of second planetary gears rotatably supported on the other side surface of said carrier;

a second sun gear disposed in such a manner as to be concentric with said inside disk and said outside disks as well as be rotatable, said second sun gear being meshed with said second planetary gears; and a single ring gear disposed in such a manner as to be concentric with said inside disk and said outside disks as well as be rotatable, said first and second planetary gears being meshed with said single ring gear while said first and second planetary gears are supported on said carrier independently of each other; and, a second rotary shaft supported in such a manner as to be concentric with said first rotary shaft and be rotatable with respect to said first rotary shaft.

7. The continuously variable transmission apparatus as set forth in claim 6, wherein the continuously variable transmission apparatus is operated with at least a high speed mode and a low-speed mode;

the second rotary shaft is rotatably driven through a gear mechanism in the high-speed mode; and the second rotary shaft is directly driven by the ring gear in the low-speed mode.

8. The continuously variable transmission apparatus as set forth in claim 6, wherein each of said first planetary gears comprises a pair of first planetary gear elements meshed with each other, one of said first planetary gear elements is meshed with said first sun gear, the other is meshed with said ring gear rotatably supported on the periphery of said first sun gear, and wherein said planetary-gear-type transmission unit comprises:

a transmission shaft disposed concentrically with said first rotary shaft; and a power transmission member for driving and rotating said second rotary shaft directly or through a gear mechanism, and said power transmission member is connectable to one of said ring gear and said transmission shaft.

9. The continuously variable transmission apparatus as set forth in claim 8, wherein each of said second planetary gears comprises a pair of second planetary gear elements meshed with each other, one of said second planetary gear elements is meshed with said second sun gear, a difference between the teeth number of said ring gear and the teeth number of said first sun gear as well as a difference between the teeth number of said ring gear and the teeth number of said second sun gear are both integer multiples of the number of said first and second planetary gears, and said first and second planetary gear elements to be meshed with said ring gear are united as an integral body.

* * * * *